United States Patent
Hardee et al.

(10) Patent No.: US 9,956,488 B2
(45) Date of Patent: May 1, 2018

(54) SYSTEM AND METHOD FOR VIDEO GAME SKILL LEVEL ADJUSTMENT

(71) Applicant: INTERNATIONAL BUSINESS MACHINES CORPORATION, Armonk, NY (US)

(72) Inventors: Christopher J. Hardee, Raleigh, NC (US); Steve Joroff, Tokyo (JP); Pamela A. Nesbitt, Durham, NC (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 15/156,370

(22) Filed: May 17, 2016

(65) Prior Publication Data
US 2017/0333795 A1 Nov. 23, 2017

(51) Int. Cl.
*G06F 17/00* (2006.01)
*A63F 13/67* (2014.01)
*A63F 13/35* (2014.01)

(52) U.S. Cl.
CPC .............. *A63F 13/67* (2014.09); *A63F 13/35* (2014.09)

(58) Field of Classification Search
None
See application file for complete search history.

(56) References Cited

U.S. PATENT DOCUMENTS

| 8,583,266 | B2 | 11/2013 | Herbrich et al. | |
| 2005/0181866 | A1* | 8/2005 | Baerlocher | G07F 17/3244 463/25 |
| 2007/0129133 | A1* | 6/2007 | Bansemer | A63F 9/0291 463/16 |
| 2007/0166680 | A1* | 7/2007 | Shibata | A63B 71/06 434/247 |
| 2007/0281285 | A1 | 12/2007 | Jayaweera | |

(Continued)

OTHER PUBLICATIONS

Burgun, Keith, "Learning to Love Handicaps in Competitive Games" Gamasutra, published May 22, 2013 [online at the internet:<URL: http://www.gamasutra.com/view/feature/192211/learning_to_love_handicaps_in_.php]. [Last Visited May 9, 2016].

(Continued)

*Primary Examiner* — Ronald Laneau
(74) *Attorney, Agent, or Firm* — F. Chau & Associates, LLC

(57) ABSTRACT

A method of video game skill level adjustment includes determining a first genre of a first video game played by a user, extracting single-player progress data of the user for the first video game, multi-player result data of the user for the first video game and meta-goal data of the user for the first video game from at least one storage device. A history profile is created of the user for the first genre including the single-player progress data for the first video game, the multi-player result data for the first video game, and the meta-goal data for the first video game. A second genre is determined of a second video game played by the user. A starting value of an in-game skill of the second video game is adjusted prior to the user playing the second video game, based on the history profile for the first genre.

19 Claims, 9 Drawing Sheets

(56) References Cited

U.S. PATENT DOCUMENTS

2008/0268943 A1    10/2008  Jacob
2009/0227313 A1*   9/2009   Minka .................... G06Q 10/06
                                                          463/14

OTHER PUBLICATIONS

Achievement (video game) [online—Wikipedia]. Internet<URL: <https://en.wikipedia.org/wiki/Achievement_%28video_gaming%29> [last visited May 9, 2016].
List of video game genres [online—Wikipedia]. Internet<URL: <https://en.wikipedia.org/wiki/List_of_video_game_genres> [last visited May 9, 2016].
Ibáñez, Jesús, and Carlos Delgado-Mata. "Adaptive two-player videogames", Expert systems with applications vol. 38, Issue 8 (2011): 9157-9163.

* cited by examiner

SYSTEM AND METHOD FOR VIDEO GAME SKILL LEVEL ADJUSTMENT

BACKGROUND

Exemplary embodiments of the present invention relate to a system and method for video game skill level adjustment and video game handicapping.

When video game users play a new video game for the first time, they may each start at a same skill level or a same level of difficulty. For example, all users may start playing a new video game at a first level and then proceed sequentially through each successive level as a prior level is traversed. Similarly, in a multi-player gaming format, a player that is new to a game may start at a relatively low skill level, regardless of prior experience with similar games. Thus, a mismatch may exist between a starting level in a new game and the likely skill level of the new user with regard to the new game. Additionally, in a multi-player format game, there may be a mismatch between the new user and the other players that the new user is matched against with regard to the relative skill in playing the new game.

Some video games incorporate handicapping systems to even the playing field between players playing in single or multiple player format games. However, such handicapping systems may include a calibration period in which the user plays the new game for a relatively long period of time prior to determining the user's relative skill level with regard to the difficulty of the game, or the skills of other players playing the game.

Thus, it may be desirable to determine a likely skill level of a player of a new game using the player's skill level in other similar games prior to playing a new game.

SUMMARY

Exemplary embodiments of the present invention provide a method of video game skill level adjustment includes determining a first genre of a first video game played by a user, extracting single-player progress data of the user for the first video game from at least one storage device, extracting multi-player result data of the user for the first video game from the at least one storage device, and extracting meta-goal data of the user for the first video game from the at least one storage device. A history profile is created of the user for the first genre. The history profile includes the single-player progress data for the first video game, the multi-player result data for the first video game, and the meta-goal data for the first video game. A second genre is determined of a second video game played by the user. A starting value of an in-game skill of the second video game is adjusted prior to the user playing the second video game for a first time, based on the history profile for the first genre, upon determining that the second genre matches the first genre.

According to an exemplary embodiment of the present invention the single-player progress data may include at least one of a completed percentage of a single-player mode of the first video game, and a number of completed levels of the first video game.

According to an exemplary embodiment of the present invention the multi-player result data may include at least one of a win/loss ratio of the user for online gameplay of the first video game, and a player ranking of the user for the online gameplay of the first video game.

According to an exemplary embodiment of the present invention the method of video game skill level adjustment may include extracting a plurality of single-player parameters from the single-player progress data. A score may be calculated for each of the single-player parameters. A single-player progress average score for the first video games may be calculated based on the average of the scores corresponding to the single-player parameters. A plurality of multi-player parameters may be extracted from the multi-player result data. A score for each of the multi-player parameters may be calculated. A multi-player result average score may be calculated for the first video game based on an average of the scores corresponding to the multi-player parameters. A plurality of meta-goal parameters from the meta-goal data may be calculated. A score may be calculated for each of the meta-goal parameters. A meta-goal average score may be calculated for the first video game based on an average of the scores corresponding to the meta-goal parameters. A history profile average score may be calculated based on an average of the single-player progress average score, the multi-player result average score, and the meta-goal average score. Adjusting the starting value of the in-game skill of the second video game may be based on the history profile average score.

According to an exemplary embodiment of the present invention the plurality of single-player parameters may include a completed percentage of a single-player mode of the first video game, and a number of completed levels of the first video game. The plurality of multi-player parameters may include a win/loss ratio of the user for online gameplay of the first video game, and a player ranking of the user for the online gameplay of the first video game.

According to an exemplary embodiment of the present invention the meta-goal data may be defined outside of parameters of the first video game.

According to an exemplary embodiment of the present invention the in-game skill may include at least one of a shooting skill, a driving skill, a mining skill, and a crafting skill.

Exemplary embodiments of the present invention provide a method of video game handicapping including determining a first genre of a first video game played by a user, extracting single-player progress data of the user for the first video game from at least one storage device, extracting multi-player result data of the user for the first video game from the at least one storage device, and extracting meta-goal data of the user for the first video game from the at least one storage device. A history profile of the user for the first genre is created. The history profile includes the single-player progress data for the first video game, the multi-player result data for the first video game, and the meta-goal data for the first video game. A second genre of a second video game played by the user is determined. A handicap level of the user for the second video game is adjusted prior to the user playing the second video game for a first time, based on the history profile for the first genre, upon determining that the second genre matches the first genre.

According to an exemplary embodiment of the present invention the method of video game skill level adjustment may include extracting a plurality of single-player parameters from the single-player progress data. A score may be calculated for each of the single-player parameters. A single-player progress average score for the first video games may be calculated based on the average of the scores corresponding to the single-player parameters. A plurality of multi-player parameters may be extracted from the multi-player result data. A score for each of the multi-player parameters may be calculated. A multi-player result average score may be calculated for the first video game based on an average of the scores corresponding to the multi-player parameters. A plurality of meta-goal parameters from the meta-goal data may be calculated. A score may be calculated for each of the meta-goal parameters. A meta-goal average score may be calculated for the first video game based on an average of the scores corresponding to the meta-goal parameters. A history profile average score may be calculated based on an average of the single-player progress average score, the multi-player result average score, and the meta-goal average score. Adjusting the starting value of the in-game skill of the second video game may be based on the history profile average score.

According to an exemplary embodiment of the present invention the plurality of single-player parameters may include a completed percentage of a single-player mode of the first video game, and a number of completed levels of the first video game. The plurality of multi-player parameters may include a win/loss ratio of the user for online gameplay of the first video game, and a player ranking of the user for the online gameplay of the first video game.

According to an exemplary embodiment of the present invention the single-player progress data may include at least one of a completed percentage of a single-player mode of the first video game, and a number of completed levels of the first video game.

According to an exemplary embodiment of the present invention the multi-player result data may include at least one of a win/loss ratio of the user for online gameplay of the first video game, and a player ranking of the user for the online gameplay of the first video game.

According to an exemplary embodiment of the present invention the meta-goal data may be defined outside of parameters of the first video game.

According to an exemplary embodiment of the present invention the method of video game handicapping may include matching the user with a competitor for online gameplay of the second video game based on the handicap level.

Exemplary embodiments of the present invention provide a method of video game skill level adjustment including searching an electronic library of video games to identify at least one related video game skill linked to a current video game played by a user, and searching a play history database of the user to determine whether the identified at least one related video game has been previously played by the user. Single-player progress data of the user is extracted for the at least one related video game from at least one storage device, upon determining that the identified at least one related video game has been previously played by the user. Multi-player result data of the user for the at least one related video game is extracted from the at least one storage device, upon determining that the identified at least one related video game has been previously played by the user. Meta-goal data of the user for the at least one related video game is extracted from the at least one storage device, upon determining that the identified at least one related video game has been previously played by the user. A history profile of the user is created. The history profile includes the single-player progress data, the multi-player result data, and the meta-goal data. A starting value of an in-game skill of the current video game is adjusted prior to the user playing the current video game for a first time, based on the history profile of the user.

According to an exemplary embodiment of the present invention the single-player progress data may include at least one of a completed percentage of a single-player mode of the identified at least one related video game, and a number of completed levels of the identified at least one related video game.

According to an exemplary embodiment of the present invention the multi-player result data may include at least one of a win/loss ratio of the user for online gameplay of the identified at least one related video game, and a player ranking of the user for the online gameplay of the identified at least one related video game.

According to an exemplary embodiment of the present invention the meta-goal data may be defined outside of parameters of the identified at least one related video game.

According to an exemplary embodiment of the present invention the in-game skill may include at least one of a shooting skill, a driving skill, a mining skill, and a crafting skill.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
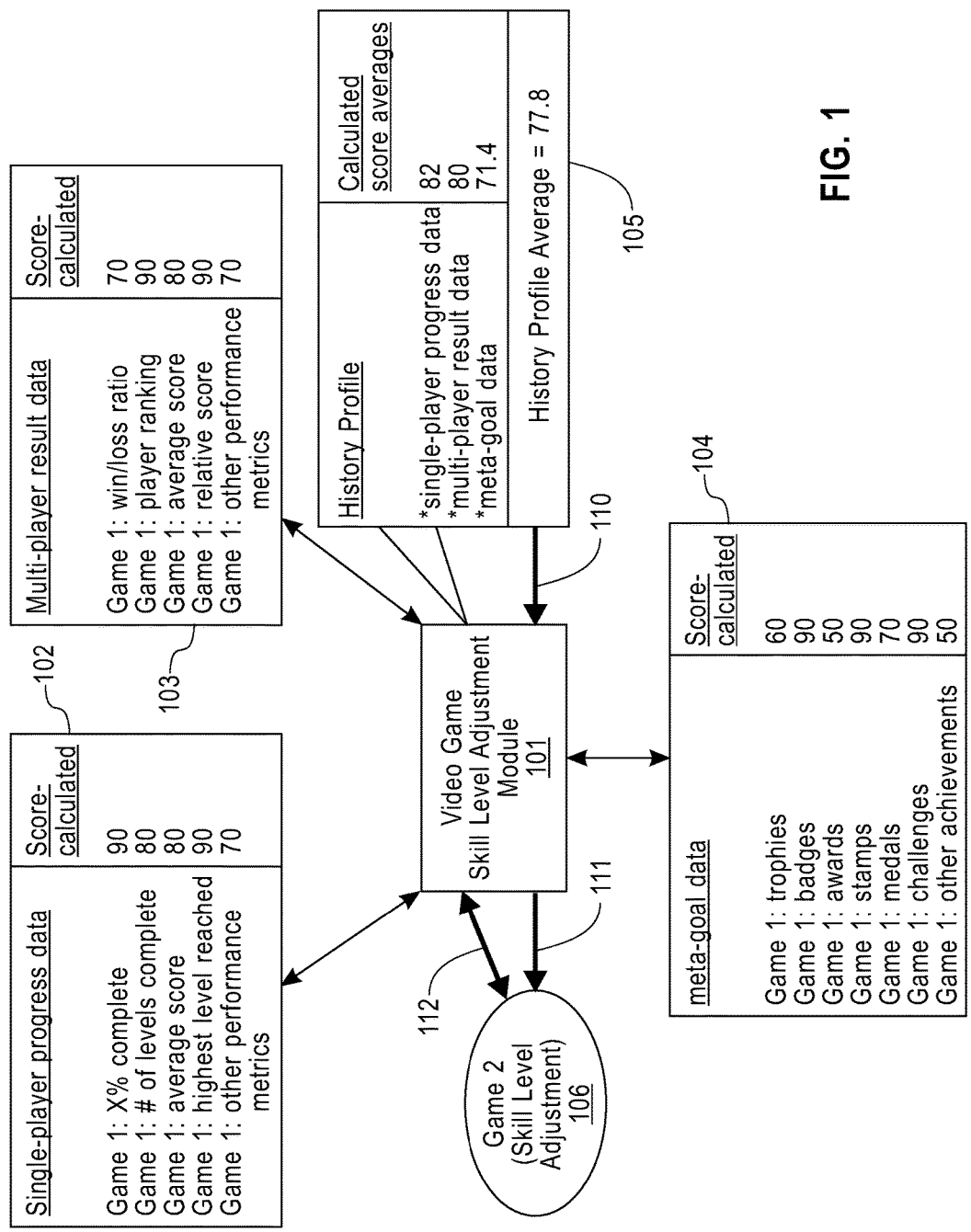
FIG. 1 illustrates a video game skill level adjustment module according to an exemplary embodiment of the present invention.

Video game users playing a new video game for the first time may each start at a same skill level or a same level of difficulty. For example, all users may start playing a new video game at a first level and then proceed sequentially through each successive level as a prior level is traversed. This may result in a relatively skilled video game player playing a number of relatively easy video game levels before reaching a level of reasonable challenge to the relatively skilled video game player. Thus, a mismatch may occur between a starting level of a video game player playing a new game and the likely skill level of the new user with regard to the new game.

Similarly, in a multi-player gaming format, a player that is new to a game may start at a relatively low skill level, regardless of prior experience with similar games. However, this may result in a highly skilled player being matched with a relatively unskilled player of a particular game. Thus, there may be a mismatch between the new user and the other players that the new user is matched against with regard to the relative skill in playing the new game.

Exemplary embodiments of the present invention provide a system and method of video game skill level adjustment. Exemplary embodiments of the present invention provide a system and method of video game skill level handicapping.

Exemplary embodiments of the present invention will be described more fully hereinafter with reference to the accompanying drawings. Like reference numerals may refer to like elements throughout the specification and drawings.

FIG. 1 illustrates a video game skill level adjustment module according to an exemplary embodiment of the present invention.

Referring to FIG. 1, a video game skill level adjustment module 101 may generate a history profile 105 for a user of a first video game. The history profile 105 may include single-player progress data 102 for the first video game, multi-player result data 103 for the first video game, and meta-goal data 104 for the first video game. The history profile 105 may include a history profile average, which may be used by the video game adjustment module 101 to adjust a starting value of an in-game skill level of the user when the user plays a second video game. The video game skill level adjustment module 101 may receive the history profile average 110 and may output 111 a skill level adjustment to the second video game (e.g., Game 2 (skill level adjusted)). For example, a user having become relatively efficient in the first game may start at a relatively higher level in the second game. As discussed below in more detail, the second game may have similar attributes to the first game and/or may be in the same or a similar genre to the first game.

Single play progress data 102 may refer to progress an individual user makes in the first video game. Single play progress data 102 may refer to a scenario where the user is playing a video game against the computer, or without the involvement of other live players. For example, single play progress data 102 may include a percentage of the first video game that has been completed, a number of levels in the first video game that have been completed, an average user score in the first video game, a highest level reached in the first video game and/or other performance metrics germane to the first video game (e.g., meeting particular performance metric benchmarks in a particular period of time). However, exemplary embodiments of the present invention are not limited thereto, and single play progress data 102 may include any desired progress data.

Multi-player result data 103 may refer to performance statistics of the user with regard to other live players of the first video game. Multi-player result data 103 may refer to a scenario where the user is playing a video game against one or more other live players, either remotely or in a same location. For example, multi-player result data 103 may include win/loss ratio, player ranking (e.g., relative to other players), average score, relative score (e.g., relative to other players) and/or other performance metrics germane to the first video game (e.g., meeting particular performance metric benchmarks in a particular period of time). However, exemplary embodiments of the present invention are not limited thereto, and multi-player result data 103 may include any desired result data.

Meta-goal data 104 may refer to one or more goals or achievements that are obtained outside of the parameters of the first video game. Meta-goal data 104 may refer to an achievement or receiving recognition outside the confines of the game environment or the game architecture. Unlike the series of quests or levels that generally define the goals of a video game and have a direct effect on further gameplay, the management of achievements may take place outside the confines of the game environment and architecture. For example, meta-goal data 104 may include trophies, badges, awards, stamps, medals, challenges and/or other achievements (e.g., unlocking a particular number of achievements). For example, achievements in a video game may include scoring a goal in a hockey or other sports game on a first shot, completing a level in a particular game platform without being hit, or completing an entire game within a predetermined period of time. However, exemplary embodiments of the present invention are not limited thereto, and meta-goal data 104 may include any desired achievement data.

Score-calculated or a calculated score may refer to a calculated score for each data value. The calculated score may be a number between 0-100 which is used to reflect a score for each data value. For example, a user completing 9 of 10 levels, may receive a calculated score of 90, and a user receiving an average score of 8,000 out of a possible 10,000 in a particular video game may receive a calculated score of 80. That is, the calculated score is a relative value which may be used to standardize a plurality of different data values (e.g., raw scores) which are initially recorded on varying scales. By standardizing the raw scores to calculated scores, the video game skill level adjustment module 101 may compile a history profile 105, which includes a history profile average score. FIG. 1 illustrates a number of exemplary calculated scores for the purpose of illustration, and exemplary embodiments of the present invention are not limited to any particular set of calculated scores.

Calculated score averages may refer to the average of the calculated scores in each of the single-player progress data 102, multi-player result data 103, and meta-goal data 104 categories.

History profile average may refer to the average of each of the calculated score averages. Thus, the history profile average may be a composite score that incorporates the calculated scores in each of the single-player progress data 102, multi-player result data 103, and meta-goal data 104 categories.

In-game skill may refer to a skill employed within a game architecture. For example, the in-game skill may be driving or shooting ability in driving or shooting games, respectively. Different levels or rankings may be applied to users having different advancement levels of driving or shooting proficiency, for example. According to an exemplary embodiment of the present invention, a single game may have more than one in-game skill, such as a driving game with a shooting element which would have both driving and shooting in-game skills.

According to some exemplary embodiments of the present invention, an in-game skill may include one or more skills that are ancillary to the primary theme of the game. For example, a game including battles between different warring factions may further include a plurality of tasks related to gathering materials and forging weapons or armor. Such a game may include mining for gold or other precious metals, which may be used in other aspects of the video game.

The video game skill level adjustment module 101 may receive the history profile average 110 and may output 111 a skill level adjustment to the second video game (e.g., Game 2 (skill level adjusted)). For example, a user having become relatively efficient in the first game may start at a relatively higher level in the second game. As discussed below in more detail, the second game may have similar attributes to the first game and/or may be in the same or a similar genre to the first game.

The video game skill level adjustment module 101 may include executable program instructions embodied therewith which perform the methods described herein according to exemplary embodiments of the present invention. The executable program instructions may be stored locally (e.g., in a hard drive) in a users' video game device (e.g., computer or video game console), or may be stored in the cloud, as discussed below in more detail.

According to an exemplary embodiment of the present invention the method of video game skill level adjustment may include extracting a plurality of single-player parameters from the single-player progress data. A score may be calculated for each of the single-player parameters. A single-player progress average score for the first video games may be calculated based on the average of the scores corresponding to the single-player parameters. A plurality of multi-player parameters may be extracted from the multi-player result data. A score for each of the multi-player parameters may be calculated. A multi-player result average score may be calculated for the first video game based on an average of the scores corresponding to the multi-player parameters. A plurality of meta-goal parameters from the meta-goal data may be calculated. A score may be calculated for each of the meta-goal parameters. A meta-goal average score may be calculated for the first video game based on an average of the scores corresponding to the meta-goal parameters. A history profile average score may be calculated based on an average of the single-player progress average score, the multi-player result average score, and the meta-goal average score. Adjusting the starting value of the in-game skill of the second video game may be based on the history profile average score.

According to an exemplary embodiment of the present invention the plurality of single-player parameters may include a completed percentage of a single-player mode of the first video game, and a number of completed levels of the first video game. The plurality of multi-player parameters may include a win/loss ratio of the user for online gameplay of the first video game, and a player ranking of the user for the online gameplay of the first video game.

Each of the single-player progress data 102, multi-player result data 103, and meta-goal data 104 may be stored on at least one storage device. For example, each of the single-player progress data 102, multi-player result data 103, and meta-goal data 104 may be stored on different storage devices, or may be stored on the same storage device. The storage device may be a hard drive included in a computer or a video game console, which may be accessed through an internet connection. The single-player progress data 102, multi-player result data 103, and meta-goal data 104 may be stored in and accessed from the cloud (e.g., through an internet connection), as discussed below in more detail.

Figure 2:
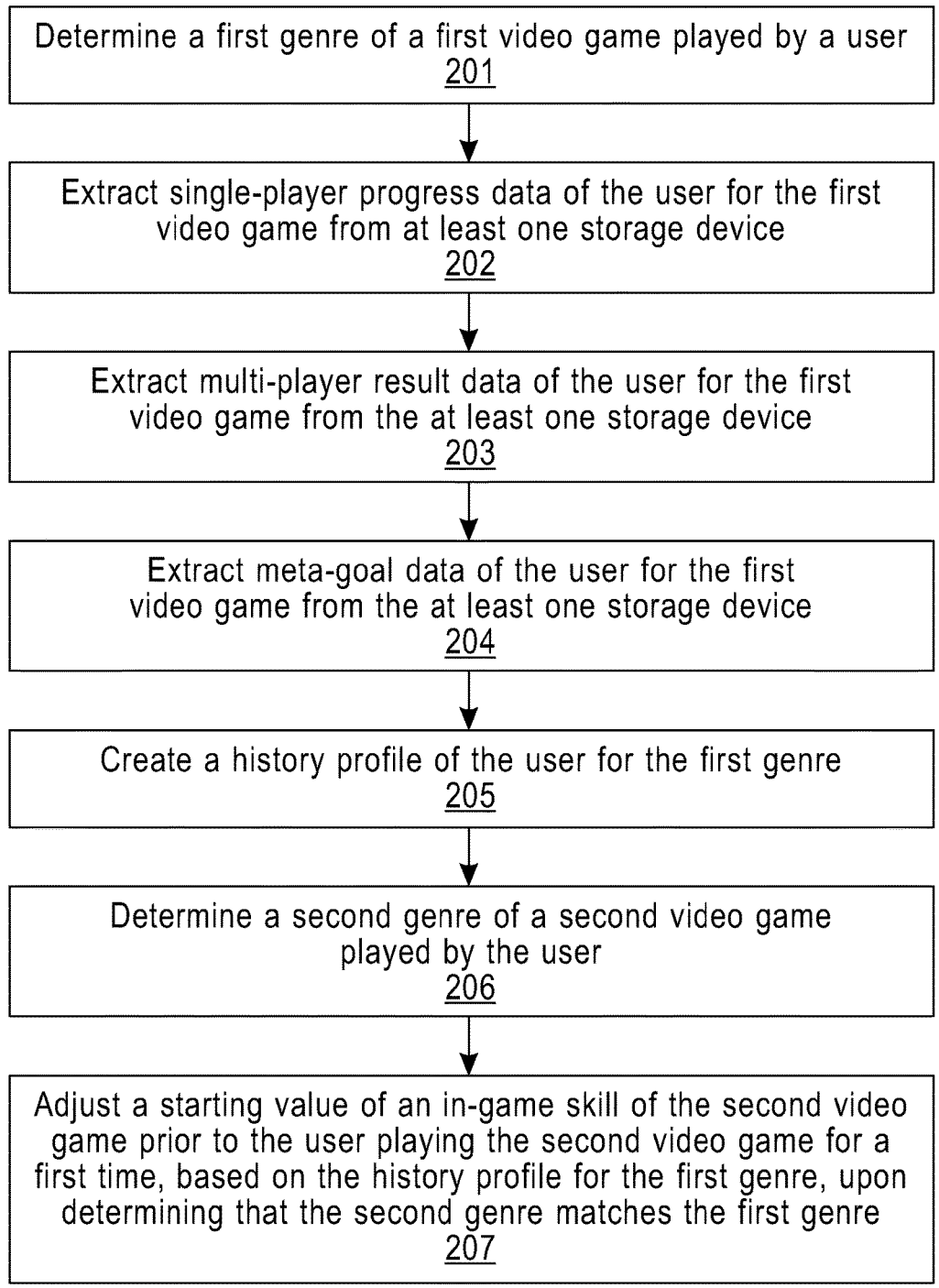
FIG. 2 is a flowchart illustrating a method of video game skill level adjustment according to an exemplary embodiment of the present invention.

FIG. 2 is a flowchart illustrating a method of video game skill level adjustment according to an exemplary embodiment of the present invention.

Referring to FIG. 2, exemplary embodiments of the present invention may provide a method of video game skill level adjustment includes determining a first genre of a first video game played by a user 201, extracting single-player progress data of the user for the first video game from at least one storage device 202, extracting multi-player result data of the user for the first video game from the at least one storage device 203, and extracting meta-goal data of the user for the first video game from the at least one storage device 204. A history profile may be created of the user for the first genre 205. The history profile may include the single-player progress data for the first video game, the multi-player result data for the first video game, and the meta-goal data for the first video game. A second genre may be determined of a second video game played by the user 206. A starting value of an in-game skill of the second video game is adjusted prior to the user playing the second video game for a first time, based on the history profile for the first genre, upon determining that the second genre matches the first genre 207.

According to an exemplary embodiment of the present invention the starting value of the in-game skill of the second video game may be adjusted by the video game skill level adjustment module 101.

According to an exemplary embodiment of the present invention the single-player progress data 102 may include at least one of a completed percentage of a single-player mode of the first video game, and a number of completed levels of the first video game.

According to an exemplary embodiment of the present invention the multi-player result data 103 may include at least one of a win/loss ratio of the user for online gameplay of the first video game, and a player ranking of the user for the online gameplay of the first video game. For example, a player may be ranked using a numeric scale, or using a scale of A-F (with "A" being the highest level). However, exemplary embodiments of the present invention are not limited thereto, and any desired ranking system may be employed. Any employed ranking scale may be converted to a calculated score of 0-100, as described herein.

According to an exemplary embodiment of the present invention the meta-goal data 104 may be defined outside of parameters of the first video game.

According to an exemplary embodiment of the present invention the in-game skill may include at least one of a shooting skill, a driving skill, a mining skill, and a crafting skill. For example, a game including battles between different warring factions may further include a plurality of tasks related to gathering materials and forging weapons or armor. Such a game may include mining for gold or other precious metals, which may be used in other aspects of the video game. A crafting skill may include employing one or more harvested materials to make the weapons or armor.

According to an exemplary embodiment of the present invention, the genre of the first or second video game may refer to a system of organizing video games. Video game genre may be based on gameplay interaction, and not just on visual or narrative aspects of the video game. A video game genre may be defined by a set of gameplay challenges. The challenges may each be classified independent of their setting or game-world content. For example, a shooter game may fall into a Shooter genre, regardless of whether it takes place in a fantasy world or in outer space. A particular video game may also fall into more than one genre (e.g., a Shooter genre and a Driving genre for a game that includes simulated driving with a shooting aspect to the video game).

According to an exemplary embodiment of the present invention when the user plays a new game, the genre of the new game may be used to match against the user's video game history to determine a starting point for their expected skill level or handicap in the new game. If similar achievements (discussed below in more detail) exist between games in the history and the new game, the skill level or handicap may be adjusted based on a predicted skill level of the user in the new game. The skill level/handicap may be altered by taking into account the length of time it takes for the skill level of the player to adapt to a new game of a genre using the history of the player. For example, based on a user's skill level, a starting level in a new game may be increased, decreased, or left at a default level based on the predicted skill level of the user in the second game.

According to an exemplary embodiment of the present invention, a genre may include one or more sub-genres. For example, there may be 7 sub-genres under just the Shooter genre.

According to an exemplary embodiment of the present invention, a platform such as the Xbox One®, Uplay®, Origin® or Steam® could define the links between games, as discussed below in more detail, by matching games having one or more overlapping genres. This could be done with an XML definition that allowed achievements or statistics from one game to alter the behavior, starting point or handicap of the user in another game. Thus a first game having one or more genres may be used to adjust the skill level of a user playing a second game having at least one overlapping genre with the first video game. As discussed below in more detail, matching genres between video games may be used to map one or more first games to one or more other games.

According to an exemplary embodiment of the present invention, each video game may have a distinct list of achievements associated with that video game. However, achievements in a first game may have similarities to achievements in a second game, and thus unlocking an achievement in a first game may indicate that unlocking a similar achievement in a second game is highly likely. For example an achievement in a first game related to a perfect shooting score may indicate a relatively high likelihood that the same user will achieve a similar achievement in a second game related to a perfect shooting score, even though other aspects of the first and second game are not identical. For example, achieving a perfect shooting score in a game that consists entirely of shooting may predict that a perfect shooting score in a driving game that incorporates a shooting aspect would be achieved by the same user. Thus, identifying overlapping achievements may be used to map a first game to a second game when performance in the first game is used to adjust skill level in the second game.

According to an exemplary embodiment of the present invention, aspects of a first video game may be mapped to a second video game at a full or reduced level. For example, a percentage of total experience gained in Call of Duty® (CoD) could go towards unlocking parts of the game in Crysis 3®. In a similar way, player rankings may be mapped, such that if the player (e.g., user) was better than 70% of opponents in CoD, they could be brought in at a handicap that expected them to perform at a chosen level, such as on par with a player that wins 50% of the time or is measured to be better than 50% of the players in Crysis3, based upon win rates and other data that can be mined from the video games. Skills or experiences in a first game may be mapped to a second game. For example, certain thresholds of skill or experience in a first game may trigger analogous specific abilities, skills or experience settings in a corresponding second game. However, mapping of skills or experiences may not translate linearly every time. That is, a first game may include a plurality of skills or experiences, and less than all of the skills or experiences in the first game may be mapped to the second game.

According to an exemplary embodiment of the present invention a "translatability" between games may be determined based on numerous users playing games in which their skills can be compared. Mapping may be pre-determined between games. Alternatively, games may be mapped according to a common set of scores from which the levels in a specific game can be determined. For example, a specific badge or achievement may be mapped between games. In a multi-player game, rankings of players in a first game may be mapped to a second game. For example, a player that is in the top ten in a first game may be ranked relatively lower in a second game, but may be ranked above average in the second game based on the players top ten ranking in the first game.

According to an exemplary embodiment of the present invention, machine learning may be employed to continually and dynamically improve in-game skill level adjustment and handicapping accuracy as a user begins to play a new game. For example, a user's shooting skills may be overstated, understated, or substantially accurately stated at the outset of playing a new game. That is, the video game skill level adjustment module 101 may dynamically communicate 112 with a video game console, computer or other device embodying the second video game 106.

Figure 3:
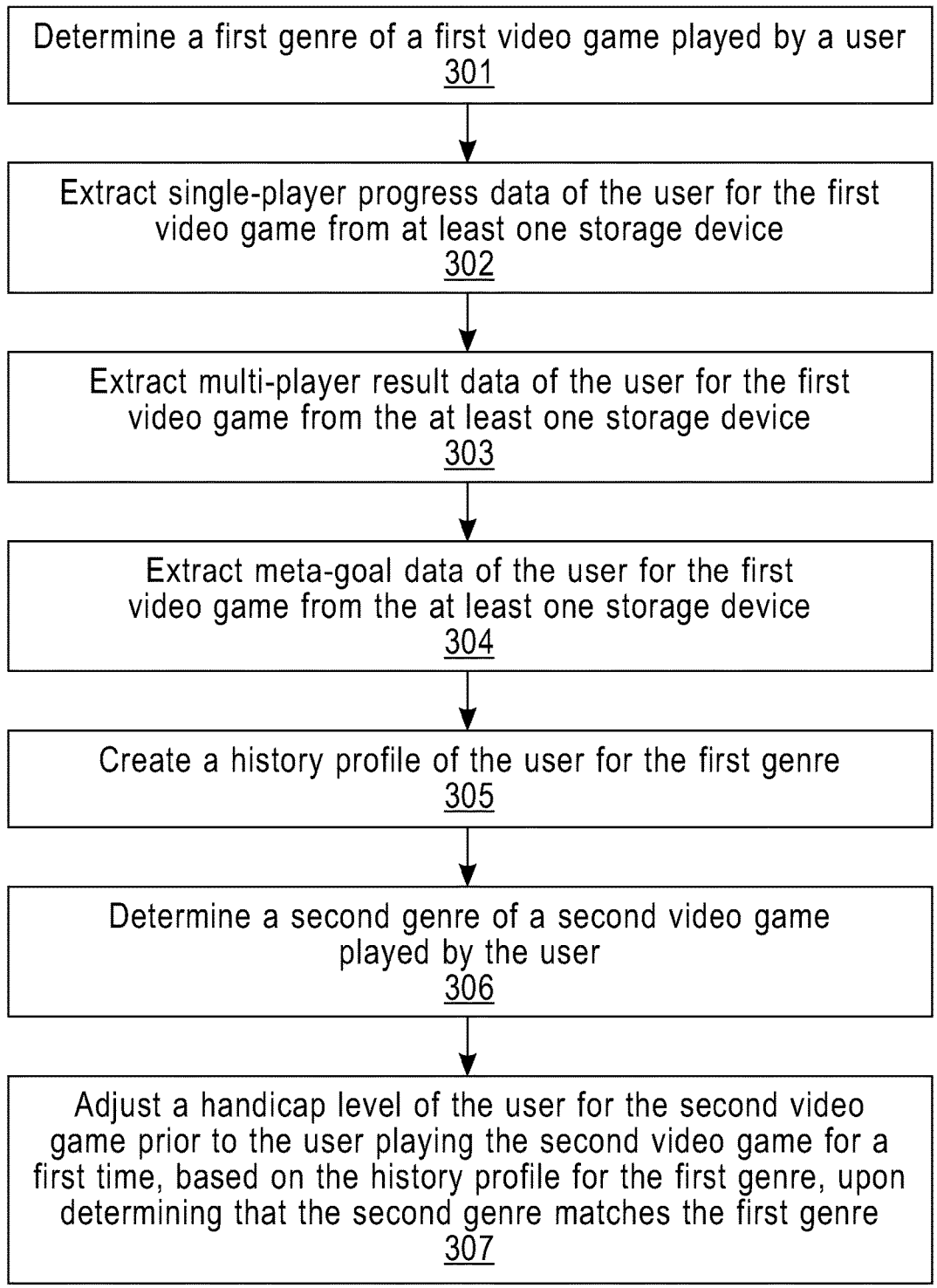
FIG. 3 illustrates a method of video game handicapping according to an exemplary embodiment of the present invention.

FIG. 3 illustrates a method of video game handicapping according to an exemplary embodiment of the present invention.

Referring to FIG. 3, exemplary embodiments of the present invention provide a method of video game skill level handicapping including determining a first genre of a first video game played by a user 301, extracting single-player progress data of the user for the first video game from at least one storage device 302, extracting multi-player result data of the user for the first video game from the at least one storage device 303, and extracting meta-goal data of the user for the first video game from the at least one storage device 304. A history profile may be created of the user for the first genre 305. The history profile may include the single-player progress data for the first video game, the multi-player result data for the first video game, and the meta-goal data for the first video game. A second genre may be determined of a second video game played by the user 306. A handicap level of the user for the second video game may be adjusted prior to the user playing the second video game for a first time, based on the history profile for the first genre, upon determining that the second genre matches the first genre 307.

According to an exemplary embodiment of the present invention, the handicap level of the user for the second video game may be adjusted by the video game skill level adjustment module 101.

The genre, single-player progress data, multi-player result data and meta-goal data illustrated in FIG. 3 may be substantially the same as the genre, single-player progress data, multi-player result data and meta-goal data described above with reference to FIG. 1, and thus duplicative descriptions may be omitted.

Handicapping or handicap level of the user refers to assigning advantage or disadvantage to a user through scoring compensation or other advantages given to the user to equalize the chances of winning between players having different skill levels. For example, a more experienced player may be disadvantaged in order to make it possible for a less experienced player to participate in the video game while having a relatively equal chance of winning. For example, and advantage/disadvantage may be conferred to a user in the form of more "lives" in game play or more time to complete a particular task in a game.

According to an exemplary embodiment of the present invention the single-player progress data may include at least one of a completed percentage of a single-player mode of the first video game, and a number of completed levels of the first video game.

According to an exemplary embodiment of the present invention the multi-player result data may include at least one of a win/loss ratio of the user for online gameplay of the first video game, and a player ranking of the user for the online gameplay of the first video game.

According to an exemplary embodiment of the present invention the meta-goal data may be defined outside of parameters of the first video game.

According to an exemplary embodiment of the present invention the method of video game handicapping may include matching the user with a competitor for online gameplay of the second video game based on the handicap level.

Figure 4:
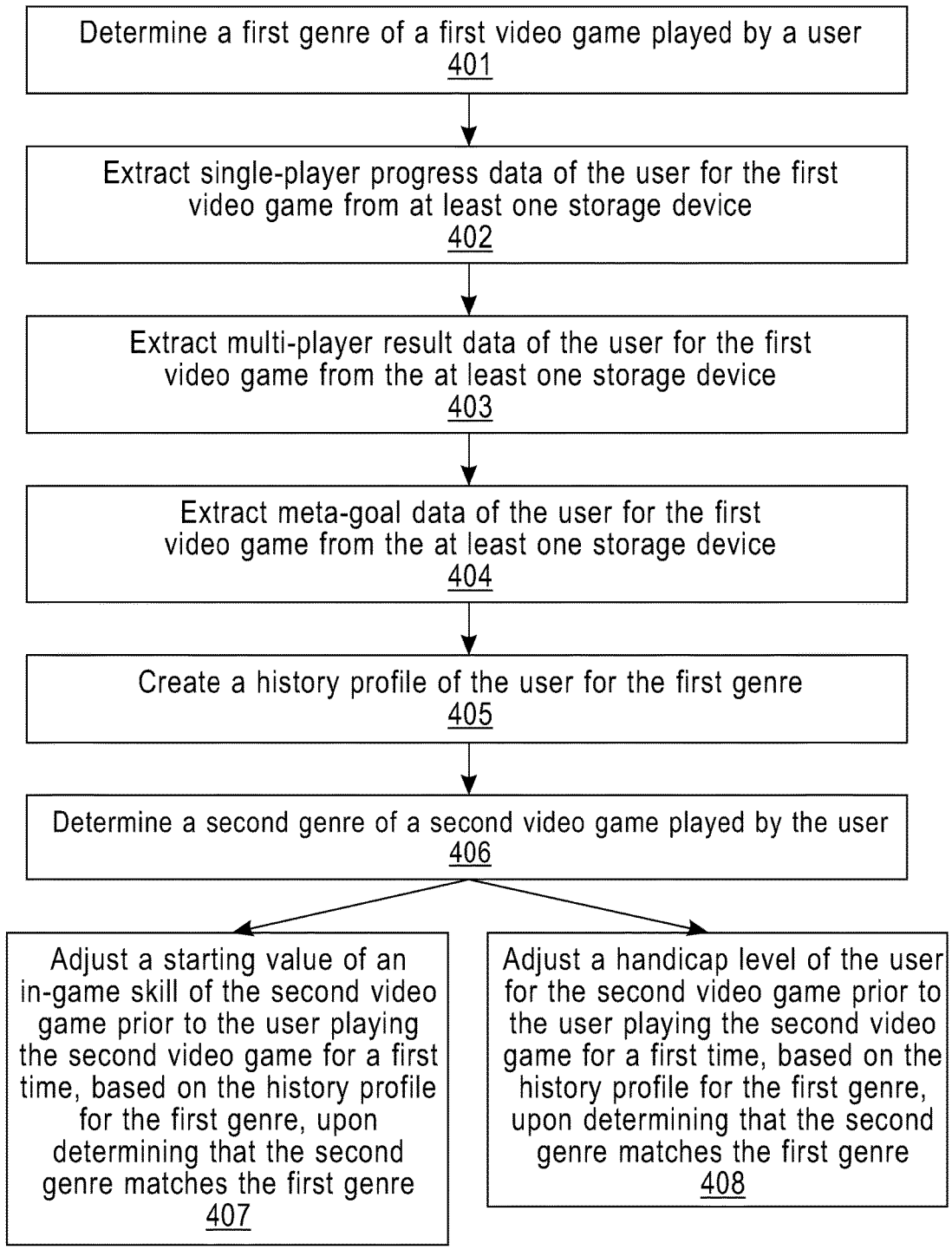
FIG. 4 is a flowchart illustrating a method of video game skill level adjustment and handicap level adjustment according to an exemplary embodiment of the present invention.

FIG. 4 is a flowchart illustrating a method of video game skill level adjustment and handicap level adjustment according to an exemplary embodiment of the present invention.

Referring to FIG. 4, both an in-game skill level adjustment and a handicap level adjustment may be performed for the second game at substantially the same time. All other steps illustrated in FIG. 4 may be substantially the same as those described above with reference to FIGS. 2 and 3, and thus duplicative descriptions may be omitted.

According to an exemplary embodiment of the present invention, the method of video game skill level adjustment and/or the handicap level of the user for the second video game may be adjusted by the video game skill level adjustment module 101.

Figure 5:
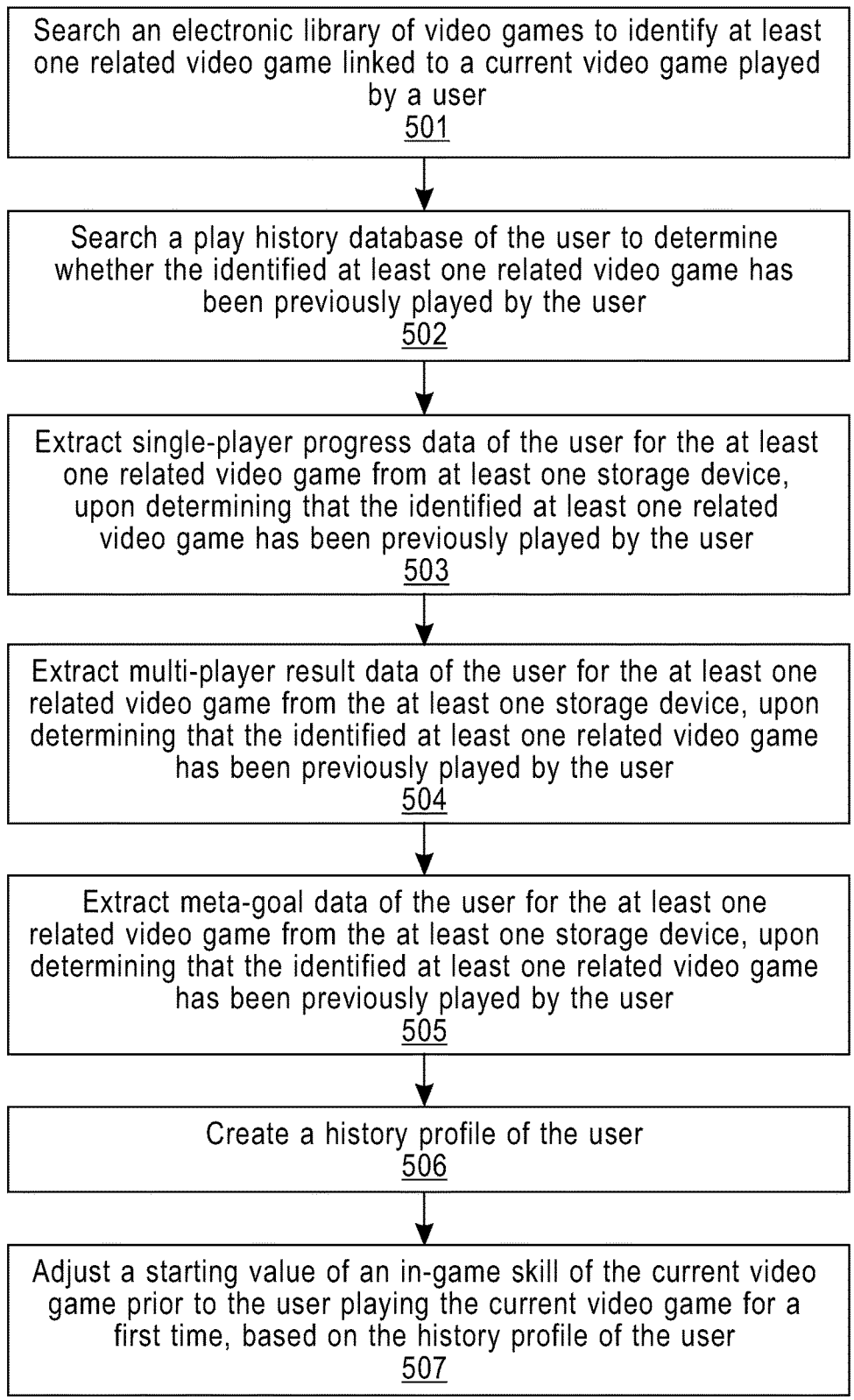
FIG. 5 is a flowchart illustrating a method of video game skill level adjustment according to an exemplary embodiment of the present invention.

FIG. 5 is a flowchart illustrating a method of video game skill level adjustment according to an exemplary embodiment of the present invention.

Referring to FIG. 5, exemplary embodiments of the present invention may provide a method of video game skill level adjustment including searching an electronic library of video games to identify at least one related video game skill linked to a current video game played by a user 501, and searching a play history database of the user to determine whether the identified at least one related video game has been previously played by the user 502. Single-player progress data of the user may be extracted for the at least one related video game from at least one storage device, upon determining that the identified at least one related video game has been previously played by the user 503. Multi-player result data of the user for the at least one related video game may be extracted from the at least one storage device, upon determining that the identified at least one related video game has been previously played by the user 504. Meta-goal data of the user for the at least one related video game may be extracted from the at least one storage device, upon determining that the identified at least one related video game has been previously played by the user 505. A history profile of the user may be created 506. The history profile may include the single-player progress data, the multi-player result data, and the meta-goal data. A starting value of an in-game skill of the current video game may be adjusted prior to the user playing the current video game for a first time, based on the history profile of the user 507.

Figure 6:
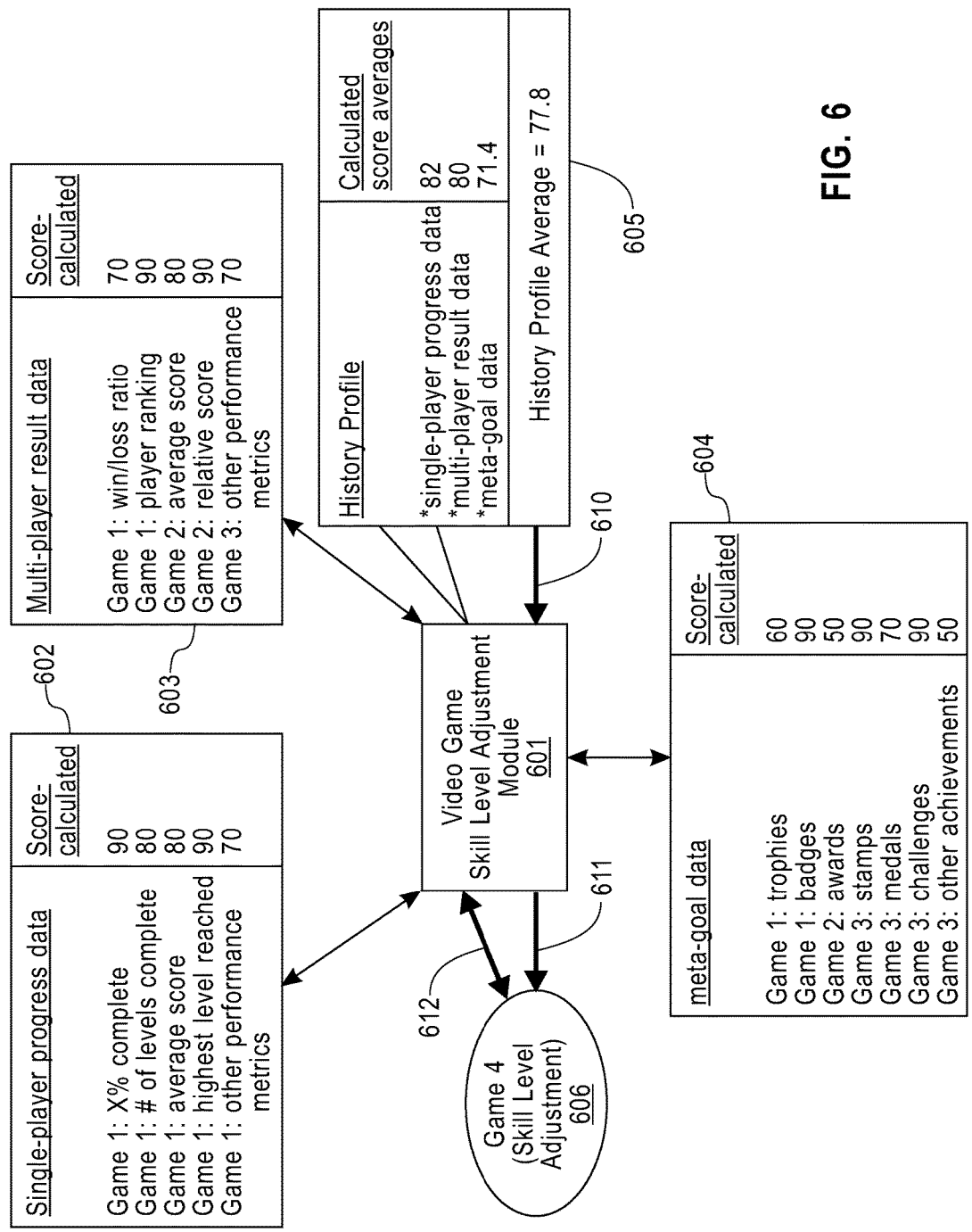
FIG. 6 illustrates a video game skill level adjustment module receiving data from multiple video games according to an exemplary embodiment of the present invention.

FIG. 6 illustrates a video game skill level adjustment module receiving data from multiple video games according to an exemplary embodiment of the present invention.

Referring to FIG. 6, a video game skill level adjustment module 601 may generate a history profile 605 for a user of a first video game. The history profile 605 may include single-player progress data 602 for a plurality of first video games, multi-player result data 603 for the plurality of first video games, and meta-goal data 604 for the plurality of first video games. The history profile 605 may include a history profile average, which may be used by the video game adjustment module 101 to adjust a starting value of an in-game skill level of the user when the user plays a second video game.

The video game skill level adjustment module 601 may receive the history profile average 610 and may output 611 a skill level adjustment to the second video game (e.g., Game 4 (skill level adjusted)). For example, a user having become relatively efficient in the first game may start at a relatively higher level in the second game. As discussed herein in more detail, the second game may have similar attributes to the plurality of first games and/or may be in the same or a similar genre(s) to the plurality of first games. The video game skill level adjustment module 601 and related components may be substantially the same as those described above with reference to FIG. 1, except that the video game skill level adjustment module 601 may receive data from a plurality of first video games, and thus duplicative descriptions may be omitted.

According to an exemplary embodiment of the present invention, the data from the plurality of first video games (e.g., game 1, game 2 and game 3) may be used to adjust a skill level or a handicap in a second video game (e.g., game 4) according to one or more exemplary embodiments of the present invention. For example, achievements or overall progress made in multiple games may have a cumulative effect on the mapping to a new game. That is, as a player reaches a predetermined level of achievement in more and more games, the likelihood of reaching the predetermined level in subsequent games is likely to increase. Thus, a skill level of handicap in a subsequent game may be adjusted to a higher level in subsequent games. This process may be dynamically adjusted as a particular play reaches higher skill levels in more and more games.

According to an exemplary embodiment of the present invention, machine learning may be employed to continually and dynamically improve in-game skill level adjustment and handicapping accuracy as a user begins to play a new game. For example, a user's shooting skills may be overstated, understated, or substantially accurately stated at the outset of playing a new game. That is, the video game skill level adjustment module 601 may dynamically communicate 612 with a video game console, computer or other device embodying the second video game 606.

Referring to FIGS. 5 and 6, according to an exemplary embodiment of the present invention the method of video game skill level adjustment may include extracting a plurality of single-player parameters from the single-player progress data. A score may be calculated for each of the single-player parameters. A single-player progress average score for the first video games may be calculated based on the average of the scores corresponding to the single-player parameters. A plurality of multi-player parameters may be extracted from the multi-player result data. A score for each of the multi-player parameters may be calculated. A multi-player result average score may be calculated for the first video game based on an average of the scores corresponding to the multi-player parameters. A plurality of meta-goal parameters from the meta-goal data may be calculated. A score may be calculated for each of the meta-goal parameters. A meta-goal average score may be calculated for the first video game based on an average of the scores corresponding to the meta-goal parameters. A history profile average score may be calculated based on an average of the single-player progress average score, the multi-player result average score, and the meta-goal average score. Adjusting the starting value of the in-game skill of the second video game may be based on the history profile average score.

According to an exemplary embodiment of the present invention the electronic library may be stored in the cloud, as described herein. Thus, the library and/or the play history database of the user may be accessed through an internet connection. The electronic library may be maintained by a particular video game manufacturer or publisher. Thus, the video game manufacturer or publisher may generate suggested links between games having similar attributes. For example, a shooting element included in a pure shooting game, and a shooting element of a driving game including a shooting element may be linked by a manufacturer as having similar attributes. That is, predetermined similarities between video games that are determined by a video game publisher or manufacturer having intimate knowledge of a game's content and architecture may be used to map a first video game to a second video game.

Figure 7:
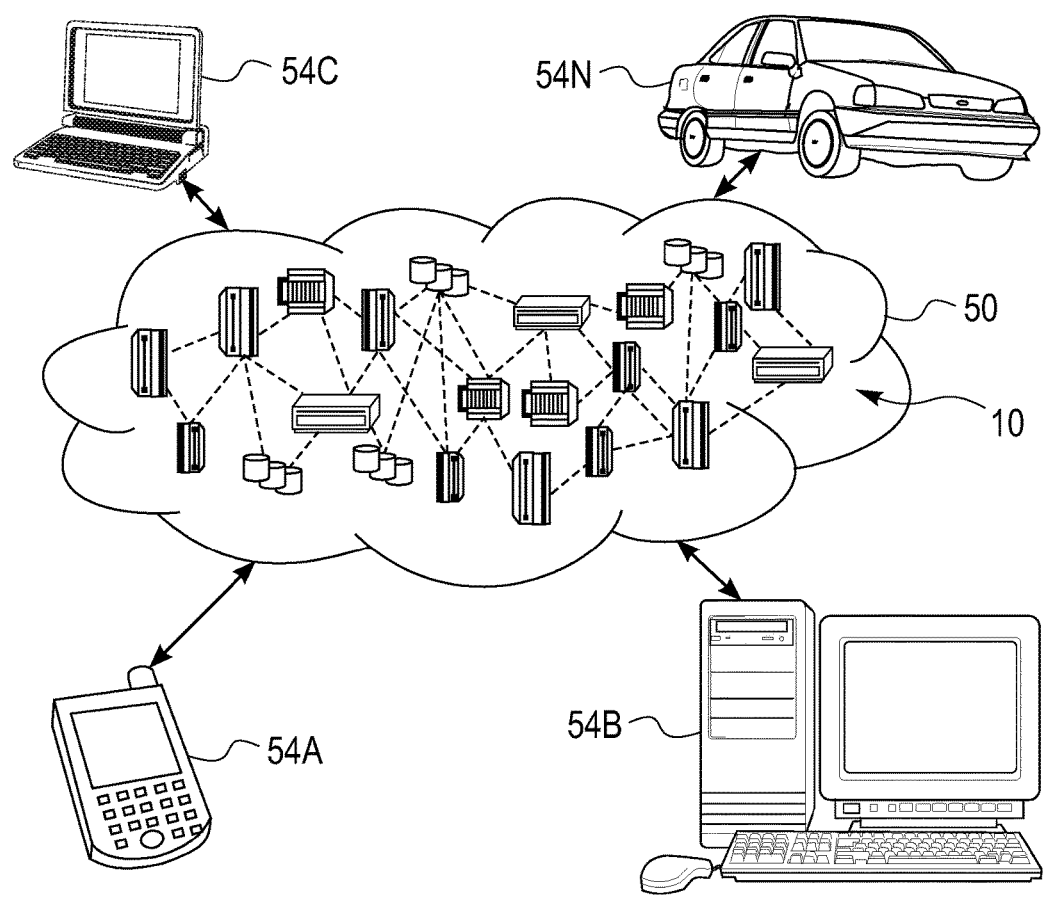
FIG. 7 depicts a cloud computing environment according to an embodiment of the present invention.
Figure 8:
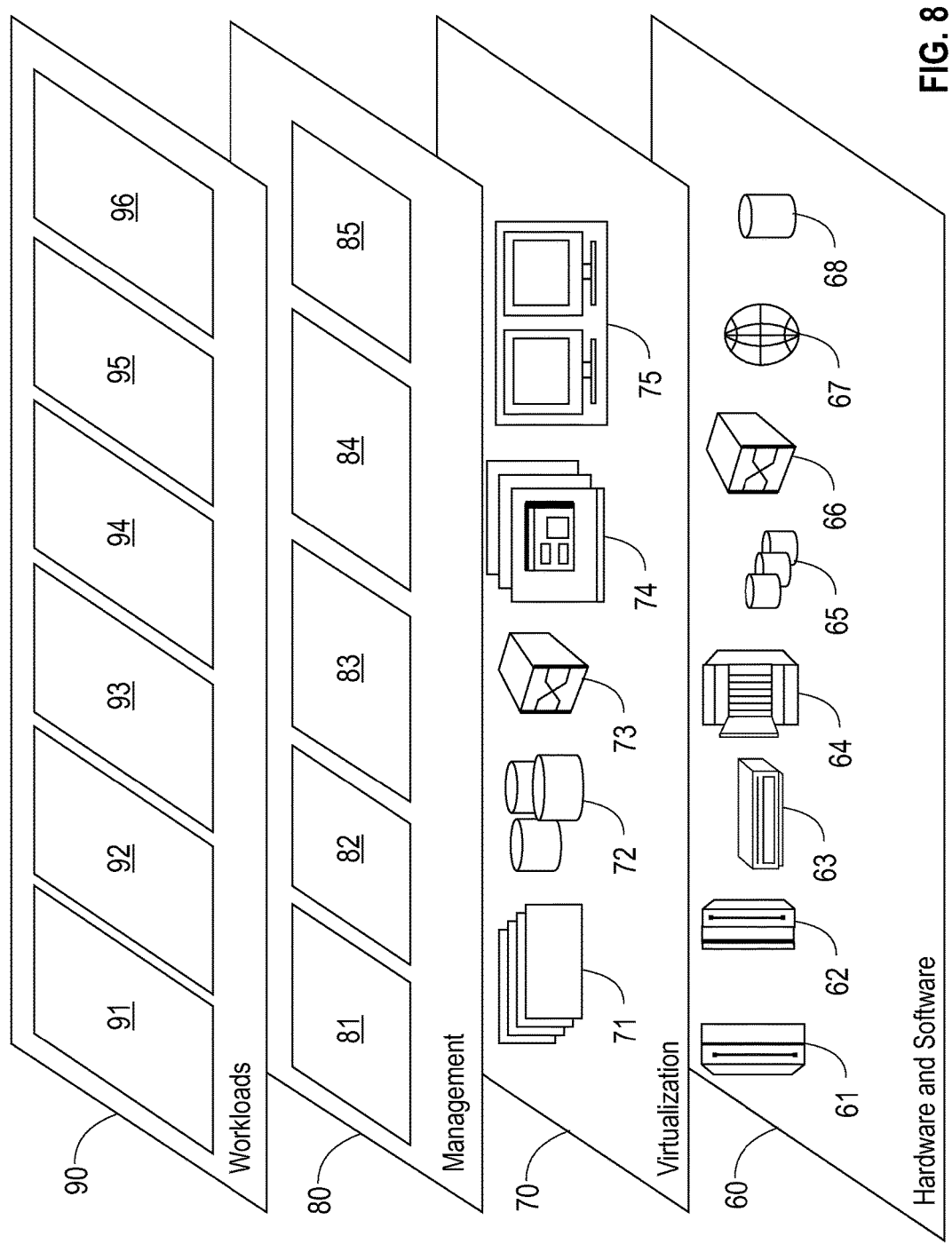
FIG. 8 depicts abstraction model layers according to an embodiment of the present invention.

FIG. 7 depicts a cloud computing environment according to an embodiment of the present invention. FIG. 8 depicts abstraction model layers according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (see, e.g., FIGS. 2-5).

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a video game skill level adjustment module 96. The video game skill level adjustment module 96 may determine a first genre of a video game, extract single-player progress data, multi-player result data and meta-goal data of the user of the video game from at least one storage device. The video game skill level adjustment module 96 may create a history profile of the user for the first genre. The history profile may include the single-player progress data for the first video game, the multi-player result data for the first video game, and the meta-goal data for the first video game. The video game skill level adjustment module 96 may determine a second genre of a second video game played by the user. A starting value of an in-game skill of the second video game is adjusted by the video game skill level adjustment module prior to the user playing the second video game for a first time, based on the history profile for the first genre, upon determining that the second genre matches the first genre.

According to an exemplary embodiment of the present invention the video game skill level adjustment module 96 may be substantially the same as the video game skill level adjustment modules 101 or 106 described above with reference to FIGS. 1 and 6, respectively, and thus duplicative descriptions may be omitted.

Figure 9:
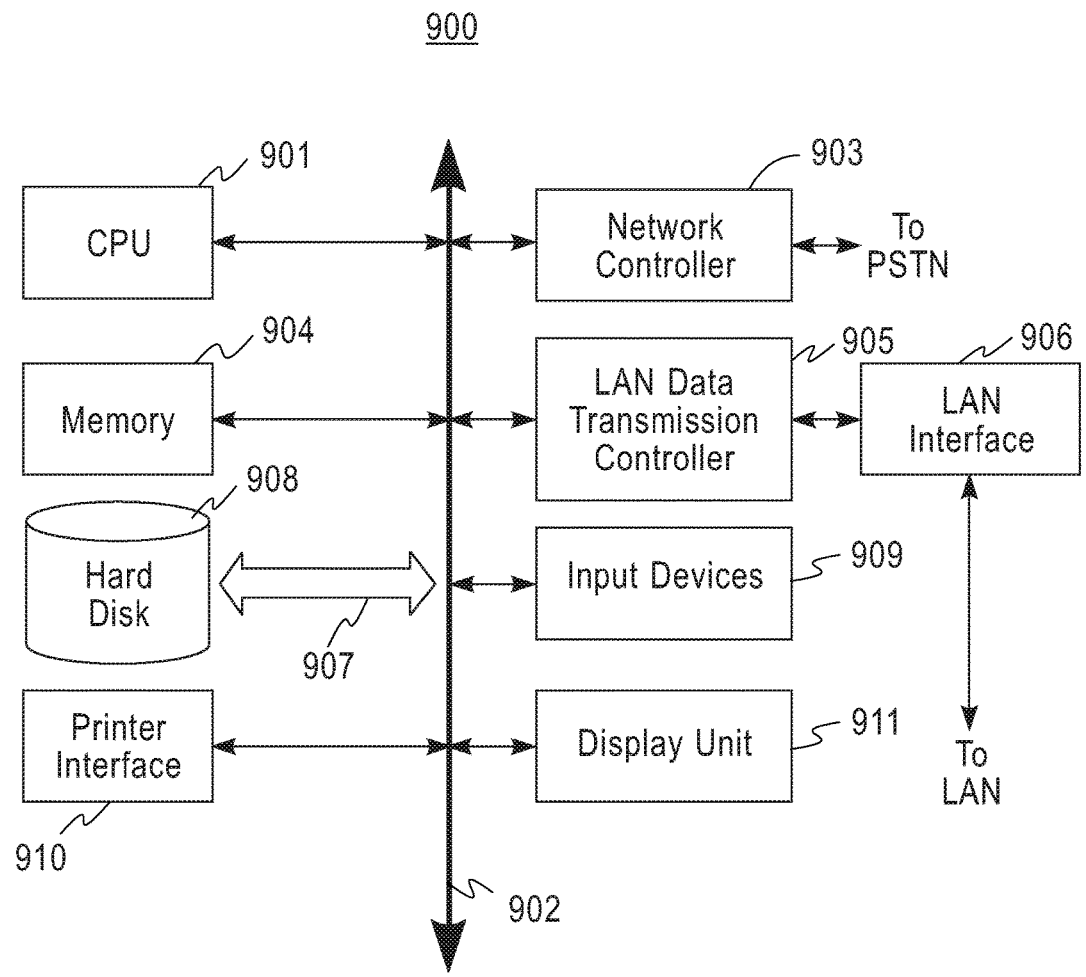
FIG. 9 illustrates an example of a computer system capable of implementing the methods according to exemplary embodiments of the present invention.

FIG. 9 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 900 may include, for example, a central processing unit (CPU) 901, random access memory (RAM) 904, a printer interface 910, a display unit 911, a local area network (LAN) data transmission controller 905, a LAN interface 906, a network controller 903, an internal bus 902, and one or more input devices 909, for example, a keyboard, mouse etc. As shown, the system 900 may be connected to a data storage device, for example, a hard disk, 908 via a link 907.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A computer-implemented method of video game skill level adjustment, comprising:
   determining, by a processor, a first genre of a first video game played by a user;
   extracting, by the processor, single-player progress data of the user for the first video game from at least one storage device;
   extracting, by the processor, multi-player result data of the user for the first video game from the at least one storage device;
   extracting, by the processor, meta-goal data of the user for the first video game from the at least one storage device;
   creating, by the processor, a history profile of the user for the first genre, wherein the history profile comprises the single-player progress data for the first video game, the multi-player result data for the first video game, and the meta-goal data for the first video game;
   determining, by the processor, a second genre of a second video game played by the user; and
   adjusting, by the processor, a starting value of an in-game skill of the second video game prior to the user playing the second video game for a first time, based on the history profile for the first genre, upon determining that the second genre matches the first genre.

2. The method of claim 1, wherein the single-player progress data comprises at least one of a completed percentage of a single-player mode of the first video game, and a number of completed levels of the first video game.

3. The method of claim 1, wherein the multi-player result data comprises at least one of a win/loss ratio of the user for online gameplay of the first video game, and a player ranking of the user for the online gameplay of the first video game.

4. The method of claim 1, wherein the meta-goal data is defined outside of parameters of the first video game.

5. The method of claim 1, further comprising:
extracting, by the processor, a plurality of single-player parameters from the single-player progress data;
calculating, by the processor, a score for each of the single-player parameters;
calculating, by the processor, a single-player progress average score for the first video game based on an average of the scores corresponding to the single-player parameters;
extracting, by the processor, a plurality of multi-player parameters from the multi-player result data;
calculating, by the processor, a score for each of the multi-player parameters;
calculating, by the processor, a multi-player result average score for the first video game based on an average of the scores corresponding to the multi-player parameters;
extracting, by the processor, a plurality of meta-goal parameters from the meta-goal data;
calculating, by the processor, a score for each of the meta-goal parameters;
calculating, by the processor, a meta-goal average score for the first video game based on an average of the scores corresponding to the meta-goal parameters; and
calculating, by the processor, a history profile average score based on an average of the single-player progress average score, the multi-player result average score, and the meta-goal average score,
wherein adjusting the starting value of the in-game skill of the second video game is based on the history profile average score.

6. The method of claim 5,
wherein the plurality of single-player parameters comprise a completed percentage of a single-player mode of the first video game, and a number of completed levels of the first video game,
wherein the plurality of multi-player parameters comprise a win/loss ratio of the user for online gameplay of the first video game, and a player ranking of the user for the online gameplay of the first video game.

7. The method of claim 1, wherein the in-game skill comprises at least one of a shooting skill, a driving skill, a mining skill, and a crafting skill.

8. A method of video game handicapping, comprising:
determining, by the processor, a first genre of a first video game played by a user;
extracting, by the processor, single-player progress data of the user for the first video game from at least one storage device;
extracting, by the processor, multi-player result data of the user for the first video game from the at least one storage device;
extracting, by the processor, meta-goal data of the user for the first video game from the at least one storage device;
creating, by the processor, a history profile of the user for the first genre, wherein the history profile comprises the single-player progress data for the first video game, the multi-player result data for the first video game, and the meta-goal data for the first video game;
determining, by the processor, a second genre of a second video game played by the user; and
adjusting, by the processor, a handicap level of the user for the second video game prior to the user playing the second video game for a first time, based on the history profile for the first genre, upon determining that the second genre matches the first genre.

9. The method of claim 8, wherein the single-player progress data comprises at least one of a completed percentage of a single-player mode of the first video game, and a number of completed levels of the first video game.

10. The method of claim 8, wherein the multi-player result data comprises at least one of a win/loss ratio of the user for online gameplay of the first video game, and a player ranking of the user for the online gameplay of the first video game.

11. The method of claim 8, wherein the meta-goal data is defined outside of parameters of the first video game.

12. The method of claim 8, further comprising:
matching the user with a competitor for online gameplay of the second video game based on the handicap level.

13. The method of claim 8, further comprising:
extracting, by the processor, a plurality of single-player parameters from the single-player progress data;
calculating, by the processor, a score for each of the single-player parameters;
calculating, by the processor, a single-player progress average score for the first video game based on an average of the scores corresponding to the single-player parameters;
extracting, by the processor, a plurality of multi-player parameters from the multi-player result data;
calculating, by the processor, a score for each of the multi-player parameters;
calculating, by the processor, a multi-player result average score for the first video game based on an average of the scores corresponding to the multi-player parameters;
extracting, by the processor, a plurality of meta-goal parameters from the meta-goal data;
calculating, by the processor, a score for each of the meta-goal parameters;
calculating, by the processor, a meta-goal average score for the first video game based on an average of the scores corresponding to the meta-goal parameters; and
calculating, by the processor, a history profile average score based on an average of the single-player progress average score, the multi-player result average score, and the meta-goal average score,
wherein adjusting the handicap level of the user for the second video game is based on the history profile average score.

14. The method of claim 13,
wherein the plurality of single-player parameters comprise a completed percentage of a single-player mode of the first video game, and a number of completed levels of the first video game,
wherein the plurality of multi-player parameters comprise a win/loss ratio of the user for online gameplay of the first video game, and a player ranking of the user for the online gameplay of the first video game.

15. A computer-implemented method of video game skill level adjustment, comprising:
searching, by the processor, an electronic library of video games to identify at least one related video game linked to a current video game played by a user;
searching, by the processor, a play history database of the user to determine whether the identified at least one related video game has been previously played by the user;

extracting, by the processor, single-player progress data of the user for the at least one related video game from at least one storage device, upon determining that the identified at least one related video game has been previously played by the user;

extracting, by the processor, multi-player result data of the user for the at least one related video game from the at least one storage device, upon determining that the identified at least one related video game has been previously played by the user;

extracting, by the processor, meta-goal data of the user for the at least one related video game from the at least one storage device, upon determining that the identified at least one related video game has been previously played by the user;

creating, by the processor, a history profile of the user, wherein the history profile comprises the single-player progress data, the multi-player result data, and the meta-goal data; and adjusting, by the processor, a starting value of an in-game skill of the current video game prior to the user playing the current video game for a first time, based on the history profile of the user.

16. The method of claim 15, wherein the single-player progress data comprises at least one of a completed percentage of a single-player mode of the identified at least one related video game, and a number of completed levels of the identified at least one related video game.

17. The method of claim 15, wherein the multi-player result data comprises at least one of a win/loss ratio of the user for online gameplay of the identified at least one related video game, and a player ranking of the user for the online gameplay of the identified at least one related video game.

18. The method of claim 15, wherein the meta-goal data is defined outside of parameters of the identified at least one related video game.

19. The method of claim 15, wherein the in-game skill comprises at least one of a shooting skill, a driving skill, a mining skill, and a crafting skill.

* * * * *